United States Patent
Jin et al.

(10) Patent No.: US 7,006,364 B2
(45) Date of Patent: Feb. 28, 2006

(54) DRIVING CIRCUIT FOR DC/DC CONVERTER

(75) Inventors: Bin Jin, Taoyuan Shien (TW);
 Zhongwei Ke, Taoyuan Shien (TW);
 Yahong Xiong, Taoyuan Shien (TW);
 Alpha J. Zhang, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 131 days.

(21) Appl. No.: 10/801,899

(22) Filed: Mar. 15, 2004

(65) Prior Publication Data

US 2005/0201128 A1 Sep. 15, 2005

(51) Int. Cl.
 *H02M 3/335* (2006.01)
(52) U.S. Cl. ............... 363/21.01; 363/21.1; 363/21.18; 363/131
(58) Field of Classification Search ................ 363/16, 363/17, 21.01, 21.1, 21.11, 21.17, 21.18, 363/41, 56.12, 97, 98, 131, 132
See application file for complete search history.

(56) References Cited

U.S. PATENT DOCUMENTS

| | | | | |
|---|---|---|---|---|
| 5,267,133 A | * | 11/1993 | Motomura et al. | 363/21.03 |
| 5,434,768 A | * | 7/1995 | Jitaru et al. | 363/21.01 |
| 6,320,765 B1 | * | 11/2001 | Yasumura | 363/21.02 |
| 2004/0022075 A1 | * | 2/2004 | Perry | 363/21.01 |
| 2005/0099827 A1 | * | 5/2005 | Sase et al. | 363/16 |

* cited by examiner

*Primary Examiner*—Jessica Han
(74) *Attorney, Agent, or Firm*—Haverstock & Owens LLP

(57) ABSTRACT

A driving circuit comprises an input terminal receiving an input of a PWM signal, a first output terminal connected to a main switch for outputting a low-side driving signal, a second output terminal connected to an active switch for outputting a high-side driving signal, a first branch having a voltage level shifting capacitor and a first buffer connected in series between the input terminal and the second output terminal; and a second branch having a delay circuit and a second buffer connected in series between the input terminal and the first output terminal. When the input of the PWM signal turns from a low level to a high level, the voltage level shifting capacitor transmits the input of PWM signal to the first buffer for turning off the active switch and then triggering the second buffer to turn on the main switch with a short time delay.

20 Claims, 6 Drawing Sheets

DRIVING CIRCUIT FOR DC/DC CONVERTER

FIELD OF THE INVENTION

The present invention relates to a power supply system and more particularly to a driving circuit for DC/DC converter.

BACKGROUND OF THE INVENTION

A high-side and low-side driver is widely applied to drive the switch-bridge of bridge type converters, such as active clamp forward converter, half-bridge converter and full-bridge converter. FIG. 1 shows a conventional configuration of an active clamp forward converter with a driving IC. In this converter, a low-side switch S1 (main switch) is employed in the primary side of the transformer T, and an active clamp branch is connected in parallel with the primary winding of the transformer T. The active clamp branch includes a high-side switch (active switch) S2 and a clamping capacitor C11 connected in series. The low-side switch S1 and the high-side switch S2 operating in complementary form a switch-bridge, and a high-side and low-side driving IC 1 is employed to drive the switch-bridge.

At present, the high-side driver and the low-side driver are usually integrated into one chip. The most popular design is shown in FIG. 2. In the driver IC 1 of this prior art, two input signals Hin, Lin are needed. One input signal (Lin) is a PWM signal to trigger the low-side driving circuit 3, and the other one (Hin) is the inverting signal of the PWM signal to trigger the high-side driving circuit 2. Two high voltage rated switches M1 and M2 are employed to achieve the voltage level shifting of the high-side driver 1, which is controlled by the inverting signal of the PWM signal. Several disadvantages occur due to the employment of the high voltage rated switches M1 and M2. Firstly, switching loss of these switches is significant especially at a high switching frequency. Secondly, the switches M1 and M2 are packaged into the driver IC, which increases the complicacy of the manufacturing. Thirdly, these high voltage rated switches increase the cost of the driver. Additionally, in order to drive the high-side switch S2 and the low-side switch S1 better, a dead-time setting circuit is needed to generate two complementary signals with optimized dead time. It is known that the ability of the source current and the sink current is an important factor to evaluate a driving circuit. In most of the driver ICs, the ability of the source current and sink current is limited, which will slow the turning on and turning off speed of the switch component in a larger power converter and will decrease the efficiency of the converter. Therefore, an additional buffer circuit is needed.

The present invention provides a low-cost high-side and low-side driver, which overcomes the disadvantages of the prior arts. It can be implemented by simple discrete circuits and can be integrated into one chip.

SUMMARY OF THE INVENTION

It is an object of the present invention to drive a high-side switch and a low-side switch in a DC/DC converter with one PWM input signal.

It is another object of the present invention to shift the voltage level for the high-side driver by a simple circuit.

It is further an object of the present invention to achieve an adjustable dead time setting function to avoid the potential cross conduction problem between the high-side and low-side switches.

It is further another an object of the present invention to have a large source and a sink current ability to increase the switching speed of the low-side switch and the high-side switch.

It is additional an object of the present invention to achieve a driving circuit for DC/DC converter with a simple structure and very low cost driving method.

According to the objects of the present invention, a high-side and low-side driving circuit for DC/DC converter is proposed. This driving circuit includes a voltage level shifting capacitor, a time delay circuit, a low side driving buffer, and a high side driving buffer.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

This driving circuit of the present invention is used for driving a switch-bridge of a DC-DC converter, which can be an active clamp forward converter, an active clamp flyback converter, an active clamp forward-flyback converter, a boost converter, or a boost half-bridge converter. The switch-bridge of the DC-DC converter is composed of a main switch (a low-side switch) and an active switch (a high-side switch) connected in series. The active switch operates in complementary to the main switch. Hereafter, for example, a driving circuit applied to an active clamp forward converter will be illustrated in detail.

Figure 3:
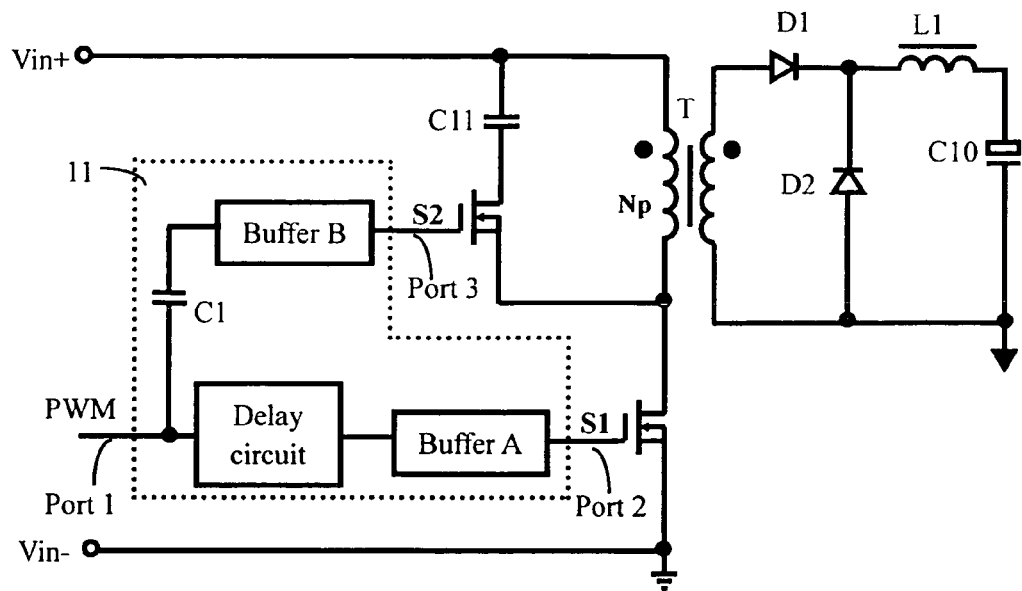
FIG. 3 shows a block diagram of a high-side and low-side driving circuit applied to an active clamp forward converter in accordance with a preferred embodiment of the present invention.

Referring to FIG. 3, a block diagram of a high-side and low-side driving circuit of the present invention applied to an active clamp forward DC/DC converter is illustrated. In this converter, a low-side switch S1 is connected in series to the primary winding of a transformer T, and an active clamp branch is connected in parallel with the primary winding of the transformer T. The active clamp branch consists of a high-side switch S2 and a clamping capacitor C11 connected in series. A driving circuit 11 has three ports. The first port is a driving signal input port 1 for receiving a PWM signal. The second port is a low side driving output port 2 which is connected to the low-side switch S1. The third port is a high side driving output port 3 which is connected to the high-side switch S2. The driving circuit 11 has two branches. One branch is a series circuit composed of a leading edge delay circuit and a buffer A for the low side between Port 1 and Port 2, and the other branch is a series circuit composed of a voltage level shifting capacitor C1 and a buffer B for the high side between Port 1 and Port 3. The low-side switch S1 and the high-side switch S2 operate in complementary.

The fundamental driving principles of the driving circuit can be described as follows:

It is impartial to assume that the PWM signal keeps in a high level voltage, and the low-side switch S1 is turned on and the high-side switch S2 is turned off at one moment. When the PWM signal drops to a low level, the signal is delivered to the buffer A immediately through the delay circuit, and the low-side switch S1 is turned off by the buffer A. The output capacitor of the low-side switch S1 is charged by the magnetizing current, and the voltage across the low-side switch S1 rises rapidly. This signal of voltage rising reflects to the buffer B immediately and then triggers the high-side driver to turn on the switch S2.

When the PWM signal turns to a high level, the capacitor C1 delivers this signal to the buffer B and triggers the buffer B to turn off the high-side switch S2 immediately. To avoid the potential cross conduction between switch S1 and S2, the PWM signal is delayed with a short time by delay circuit and then triggers the buffer A to turn on the switch S1 after turning off of the switch S2.

Figure 4:
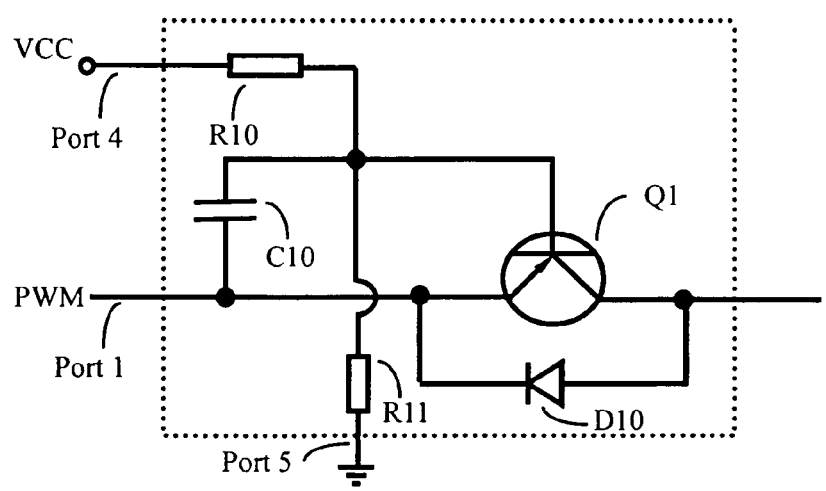
FIG. 4 shows a schematic circuit of a leading edge delay circuit that is one embodiment of the dead-time set circuit implemented in the present invention.

FIG. 4 shows a detailed configuration of a leading edge delay circuit that is one embodiment of the dead-time set circuit used in the driving circuit of the present invention. Port 1 is an input terminal connected to the PWM signal, Port 4 is connected to a voltage source VCC, and Port 5 is connected to the ground. A PNP transistor Q1 includes an emitter terminal connected to the PWM signal, a collector terminal connected to the output of the delay circuit, and a base terminal connected to the voltage source through a resistor R10 and connected to the ground through a resistor R11. A capacitor C10 is coupled between the base terminal and the emitter terminal of the transistor Q1. A diode D10 includes an anode terminal connected to the collector terminal of the transistor Q1, and a cathode terminal connected to the emitter terminal of the transistor Q1.

While the PWM signal is low, the transistor Q1 is kept in an OFF state, since a positive voltage is coupled across C10 and applied between the emitter terminal and the base terminal of the transistor Q1. When the PWM signal turns to a high level, the capacitor C10 is discharged through the resistor R10 and resistor R11. The transistor Q1 turns on until the voltage across the capacitor C10 discharges from positive to negative. Therefore, a short time of turning on delay is obtained between the output terminal and the input terminal of the delay circuit. The delay time can be set by the capacitance of the capacitor C10 and the resistance R10 and R11. When the PWM signal drops to a low level, the signal is delivered through the diode D10 directly. There is no delay function for turning off time.

Figure 5A:
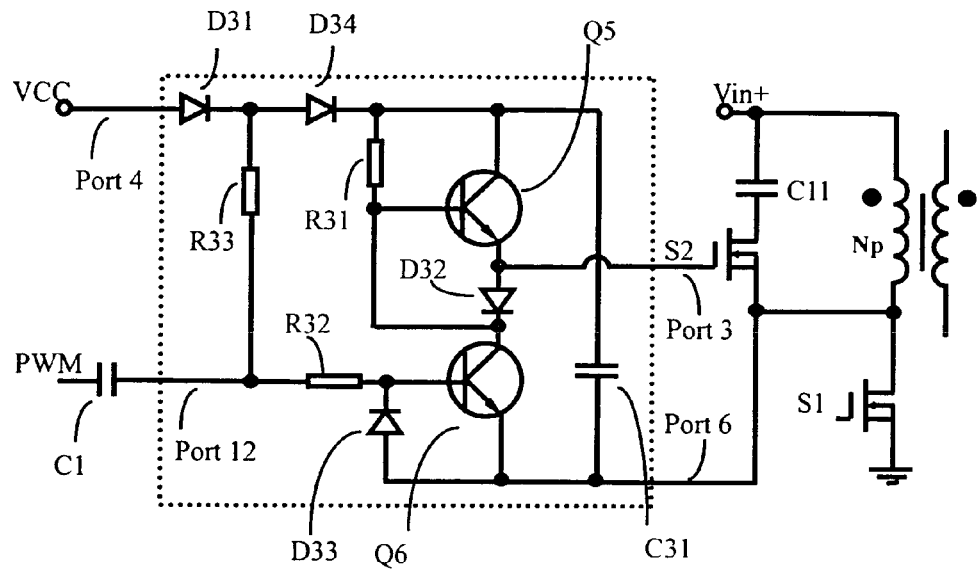
FIG. 5A shows a schematic circuit of a high-side driving circuit with an embodiment of the present invention to drive the high-side switch.

FIG. 5A shows a detailed configuration of the high-side driving circuit used in the present invention, which is composed of the capacitor C1 and the buffer B circuit. The capacitor C1 achieves the voltage level shifter function. One terminal of the capacitor C1 is connected to the PWM input signal, and the other terminal of the capacitor C1 is connected to the buffer B circuit. Port 6 of the buffer B circuit is connected to the source of the switch S2. A boost trap circuit including diode D31 and D34 which are connected in series with a capacitor C31 is coupled between the voltage source VCC and Port 6. A PNP transistor Q5 is applied with a collector terminal connected to the first terminal of the capacitor C31, a base terminal connected to the collector terminal through a resistor R31, and an emitter terminal connected to the gate terminal of the high-side switch. Another NPN transistor Q6 includes a base terminal connected to the capacitor C1 through a current limited resistor R32, a collector terminal connected to the base terminal of the transistor Q5, and an emitter terminal connected to the port 6. The diodes D32 and D33 are inversely paralleled between the base terminal and the emitter terminal of the transistors Q5 and Q6, respectively. These components form the fundamental high-side driving circuit. When the switch S2 is in an OFF state, a resistor R33 connected between Port 12 and the cathode terminal of the boost trap diode D31 provides a constant bias current to the transistor Q6.

When the voltage of PWM is low and the switch S1 is in an OFF state, a high voltage occurs in Port 6, which keeps the transistor Q6 in an OFF state due to the conduction of the diode D33. The gate to source voltage of the switch S2 can be built up through the transistor Q5, which turns the switch S2 on. When the PWM signal turns from low to high, this signal is delivered to the base terminal of the transistor Q6 through the capacitor C1 and the resistor R32, and the transistor Q6 is turned on immediately. The gate capacitor of the switch S2 is discharged through the diode D32 and the transistor Q6 soon, and the transistor Q5 and the switch S2 are turned off. When the switch S1 is turned on, the transistor Q6 keeps in an ON state with a bias current from Vcc to the base terminal of the transistor Q6 through the diode D31, the resistor R33 and R32, the transistor Q6 and the switch S1. The switch S2 keeps in an OFF state with its gate voltage clamped at a low level. The voltage of the capacitor C1 is discharged to a low voltage through the resistor R32, the transistor Q6 and the switch S1. Moreover, the capacitor C1 and the resistor R32 is a RC snubber for the switch S2.

Figure 5B:
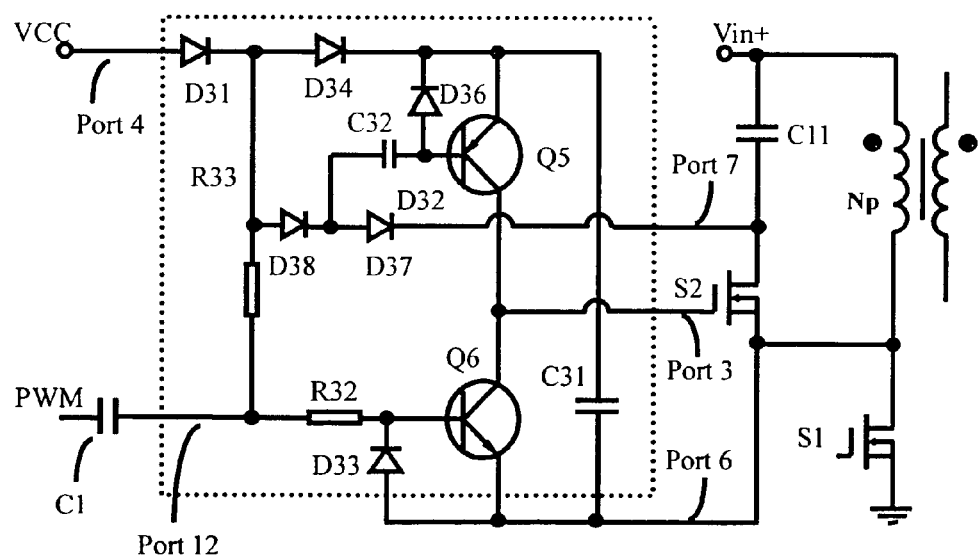
FIG. 5B shows a schematic circuit of a high-side driving circuit with another embodiment of the present invention to drive the high-side switch.

FIG. 5B shows the schematic circuit of the high-side driving circuit in accordance with another embodiment of the present invention to drive the switch S2. Comparing with the high-side driving circuit shown in FIG. 5A, the only difference is the charge circuit for the switch S2. The resistor R31 and the diode D32 are removed. The transistor Q5 is replaced with a PNP transistor, which includes an emitter terminal connected to the first terminal of the capacitor C31, a base terminal connected to the emitter terminal through a diode D36, and a collector terminal connected to the gate of the switch S2. Port 7 is the drain terminal of the high-side switch S2. Diodes D38 and D37 are connected in series and between the cathode terminal of the diode D31 and Port 7. A capacitor C32 is connected between the base terminal of the transistor Q5 and the cathode terminal of the diode D38.

When the PWM signal is high and the low-side switch S1 is in an ON state, the voltage across the capacitor C32 is zero and the diode D37 is in an OFF state with a reversed voltage. During this interval, the transistor Q5 is OFF and the transistor Q6 is ON. When the PWM signal turns to a low level, the low-side switch S1 is turned off, and the voltage of Port 6 rises. When the voltage of port 6 is the same with that of Port 7, the diode D37 conducts, the transistor Q5 is turned on with a base current through the capacitor C32 and the diode D37, and the switch S2 is turned on. After the gate-to-source voltage of the switch S2 and the voltage of the capacitor C32 are charged to Vcc, the transistor Q5 is turned off immediately, and the gate-to-source voltage of the switch S2 is kept in Vcc. When the PWM signal turns to a highlevel, the switch S1 is turned on and the capacitor C32 is discharged to zero through the diode D38 and the diode D36. Other operations are the same as those in the floating driver shown in FIG. 5A. This floating driver provides the zero voltage switching conduction for the switch S2.

Figure 1:
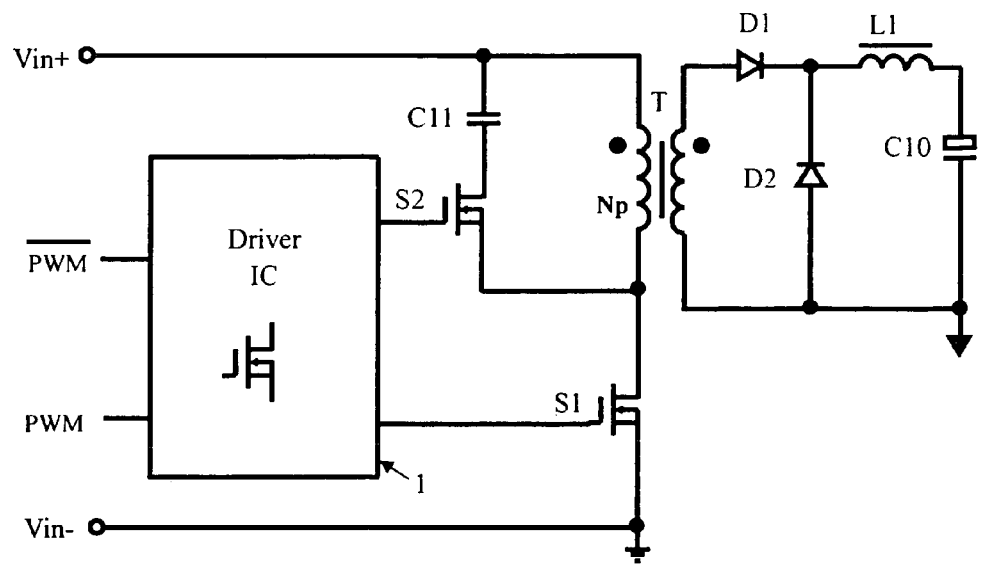
FIG. 1 shows a conventional high-side and low-side driving IC applied to an active clamp forward DC/DC converter according to the prior art.
Figure 2:
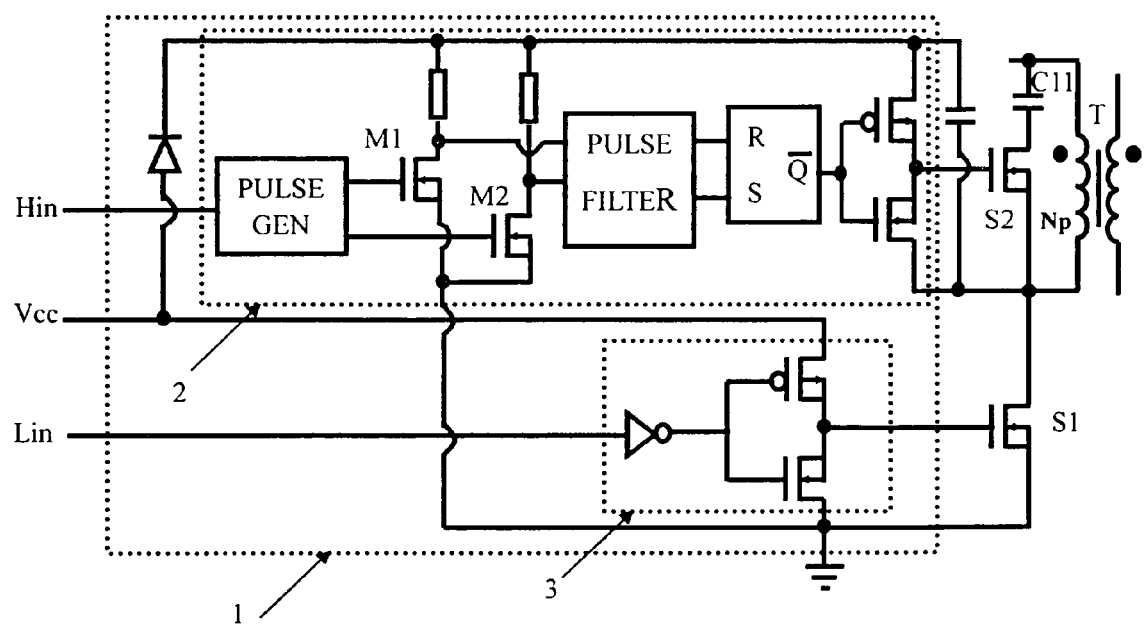
FIG. 2 shows the most popular design with high-side and low-side driver according to the prior art.
Figure 6:
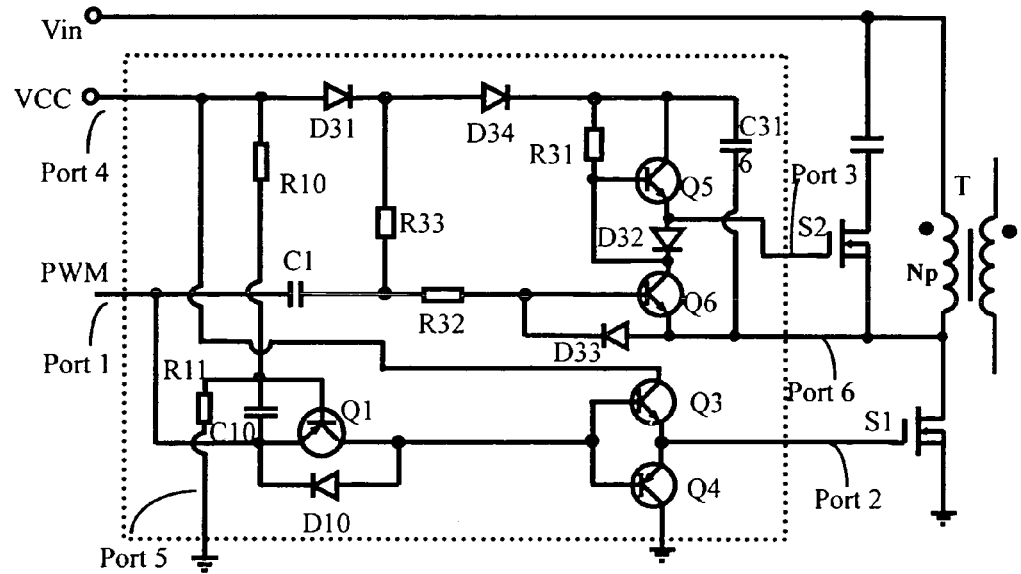
FIG. 6 shows a schematic circuit of a whole high-side and low-side driver applied to an active clamp forward DC/DC converter in accordance with an embodiment of the present invention.

FIG. 6 shows the circuit diagram of the whole high-side and low-side driving circuit in accordance with an embodiment of the present invention applied to the active clamp forward DC/DC converter. The circuit described in FIG. 6 originates from the circuit shown in FIG. 2. The block delay time circuit is replaced with the previous leading edge delay circuit described in FIG. 4. The block of buffer A is replaced with the transistor Q3 and Q4, and the block of buffer B is replaced with the previous circuit described in FIG. 5A.

Figure 7:
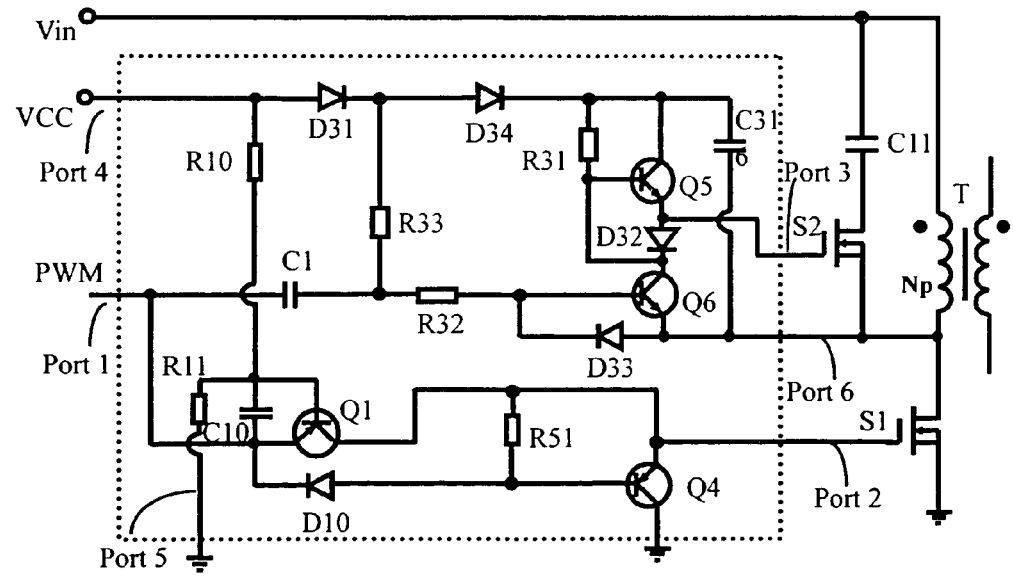
FIG. 7 shows a schematic circuit of a whole high-side and low-side driver applied to an active clamp forward DC/DC converter in accordance with another embodiment of the present invention.

FIG. 7 shows the schematic circuit of a high-side and low-side driving circuit in accordance with another embodiment of the present invention applied to the active clamp forward DC/DC converter. Comparing to FIG. 6, the driving circuit of FIG. 7 is a simplified circuit structure by removing the transistor Q3 and adding a resistor R51 paralleled with the base-emitter of the transistor Q4. In additional, the anode terminal of the diode D10 should be connected to the base terminal of the transistor Q4. When the PWM signal turns to a high level, the switch S1 is driven by the PWM signal through the transistor Q1 with a time delay. When the PWM signal turns to a low level, the gate capacitor of the switch S1 is discharged through the transistor Q4.

Figure 8:
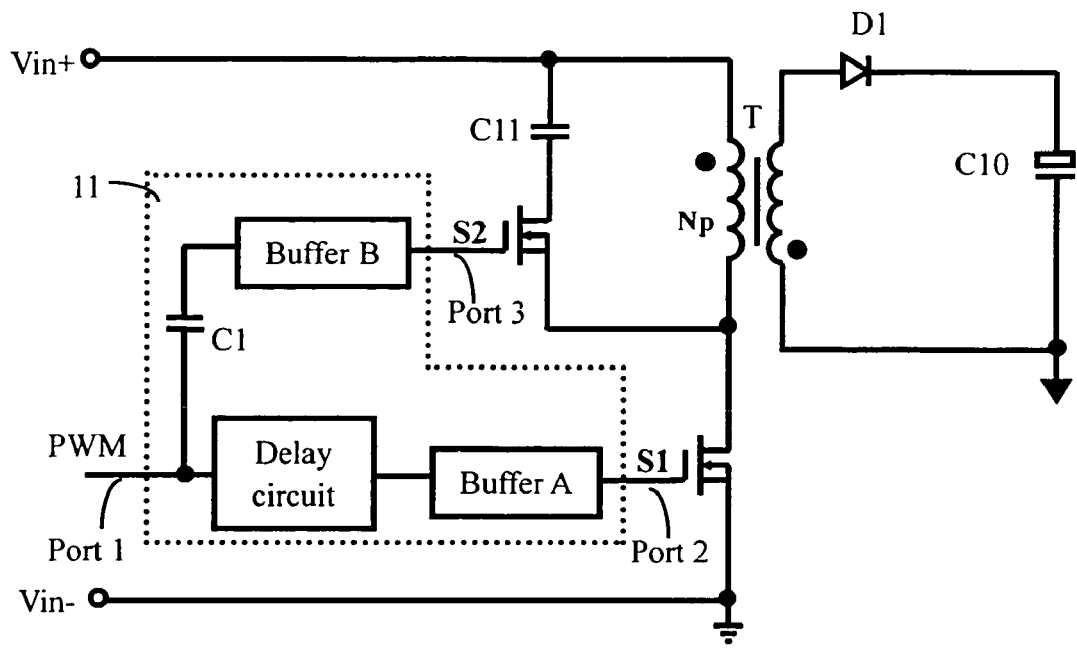
FIG. 8 shows a block diagram of a high-side and low-side driving circuit applied to an active clamp flyback converter in accordance with another embodiment of the present invention.
Figure 9:
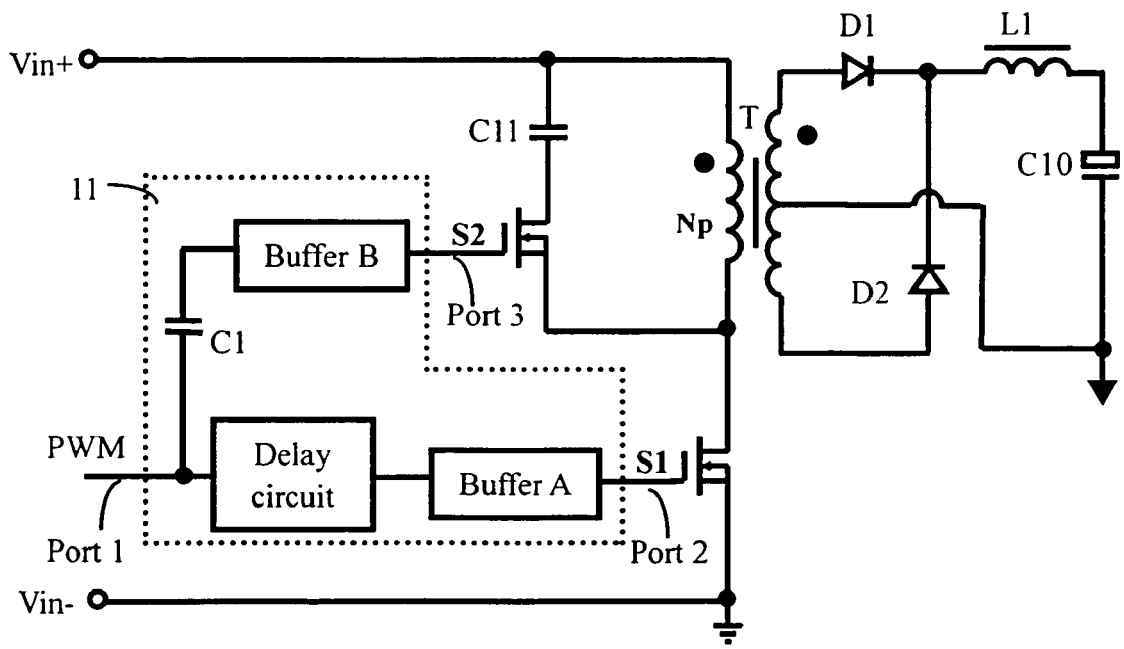
FIG. 9 shows a block diagram of a high-side and low-side driving circuit applied to an active clamp forward-flyback converter in accordance with another embodiment of the present invention.
Figure 10:
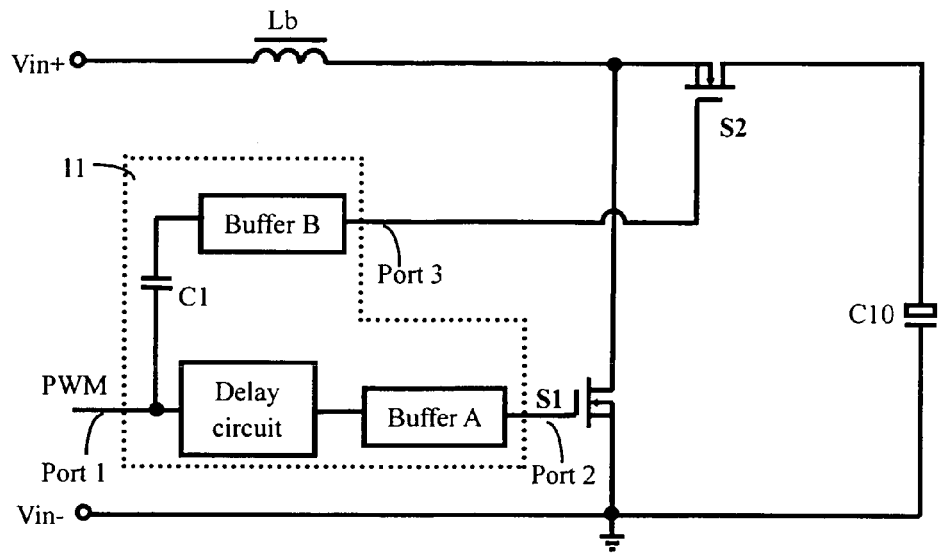
FIG. 10 shows a block diagram of a high-side and low-side driving circuit applied to a boost converter in accordance with another embodiment of the present invention.
Figure 11:
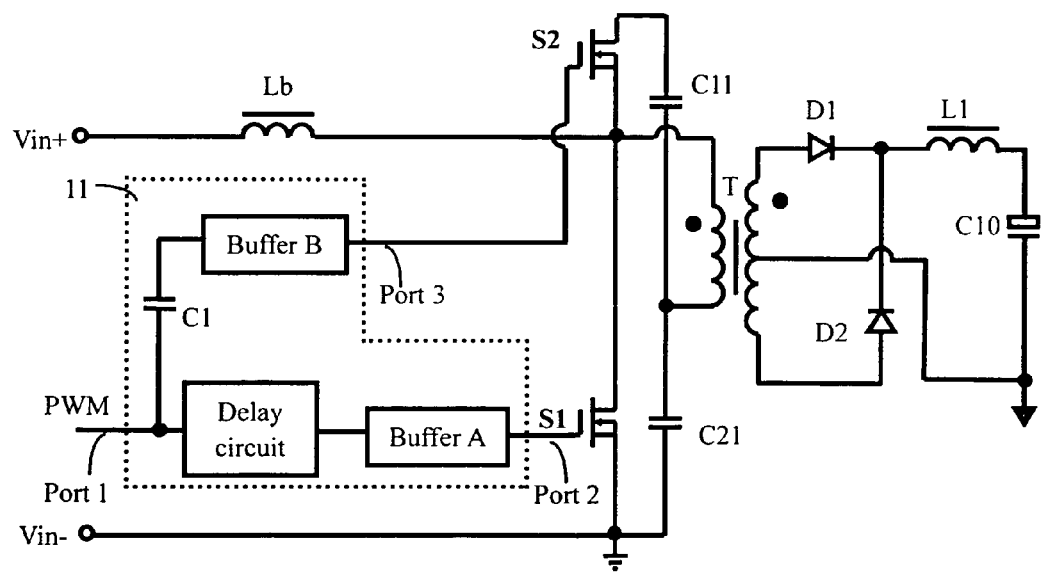
FIG. 11 shows a block diagram of a high-side and low-side driving circuit applied to a boost half bridge converter in accordance with another embodiment of the present invention.

Those skilled in the pertinent art will understand, however, that the driving circuit of the present invention may be implemented in other switch-bridge topologies of other DC-DC converters. FIG. 8 shows a block diagram of a high-side and low-side driving circuit applied to an active clamp flyback converter. FIG. 9 shows a block diagram of a high-side and low-side driving circuit applied to an active clamp forward-flyback converter. FIG. 10 shows a block diagram of a high-side and low-side driving circuit applied to a boost converter. FIG. 11 shows a block diagram of a high-side and low-side driving circuit applied to a boost half bridge converter in accordance with another embodiment of the present invention. Such variations do not depart from the gist of the invention and are not described in detail herein.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A driving circuit for a switch-bridge of a DC-DC converter, said switch-bridge comprising a main switch connected in series with an active switch operating in complementary to said main switch, comprising:
   an input terminal receiving an input of a PWM signal;
   a first output terminal connected to said main switch for outputting a low-side driving signal;
   a second output terminal connected to said active switch for outputting a high-side driving signal;
   a first branch having a voltage level shifting capacitor and a first buffer connected in series between said input terminal and said second output terminal; and
   a second branch having a delay circuit and a second buffer connected in series between said input terminal and said first output terminal;
   wherein when said input of said PWM signal drops from a high level to a low level, said input of PWM signal is transmitted to said second buffer through said delay circuit for turning off said main switch and then triggering said first buffer to turn on said active switch, and when said input of PWM signal turns from said low level to said high level, said voltage level shifting capacitor transmits said input of PWM signal to said first buffer for turning off said active switch and then triggering said second buffer to turn on said main switch with a short time delay.

2. The driving circuit according to claim 1, wherein said DC-DC converter is one selected from a group consisting of an active clamp forward converter, an active clamp flyback converter, an active clamp forward-flyback converter, a boost converter, and a boost half bridge converter.

3. The driving circuit according to claim 1, wherein said delay circuit is a leading edge delay circuit and comprising:
   a switch having an emitter terminal connected to said input terminal, a collector terminal connected to an output of said delay circuit, and a base terminal connected to a voltage source through a first resistor and connected to the ground through a second resistor;
   a capacitor coupled between said base terminal and said emitter terminal of said switch; and
   a diode having an anode terminal connected to said collector terminal and a cathode terminal connected to said emitter terminal of said switch.

4. The driving circuit according to claim 3, wherein said switch is a PNP transistor.

5. The driving circuit according to claim 1, wherein said second buffer comprises:
   a NPN transistor; and
   a PNP transistor, wherein both emitter terminals of said NPN transistor and said PNP transistor are connected to said first output terminal, and both base terminals of said NPN transistor and said PNP transistor are connected to an output terminal of said delay circuit.

6. The driving circuit according to claim 1, wherein said first buffer comprises:
a terminal connected to a source terminal of said active switch;
a first diode and a second diode connected in series with a capacitor coupled between a voltage source and said terminal, which forms a boost trap circuit;
a first transistor having a collector terminal connected to a terminal of said capacitor, a base terminal connected to said collector terminal thereof through a resistor, and an emitter terminal connected to a gate terminal of said active switch;
a second transistor having a base terminal connected to said voltage level shifting capacitor through a current limited resistor, a collector terminal connected to said base terminal of said first transistor, and an emitter terminal connected to said terminal; and
a third diode and a fourth diode inversely arranged between said base terminal and said emitter terminal of said first transistor and said second transistor respectively.

7. The driving circuit according to claim 6, wherein said first transistor and second transistors are both NPN transistors.

8. The driving circuit according to claim 1, wherein said first buffer comprises:
a first terminal connected to a source terminal of said active switch;
a first diode and a second diode connected in series with a first capacitor coupled between a voltage source and said first terminal, which forms a boost trap circuit;
a first transistor having an emitter terminal connected to a terminal of said capacitor, a base terminal connected to said emitter terminal thereof through a third diode, and a collector terminal connected to a gate terminal of said active switch;
a second terminal connected to a drain terminal of said active switch;
a fourth diode and a fifth diode in series arranged between a cathode terminal of said first diode and said second terminal;
a second capacitor having a terminal connected to said base terminal of said first transistor, and the other terminal connected to a cathode terminal of said fourth diode;
a second transistor having a base terminal connected to said voltage level shifting capacitor through a current limited resistor, a collector terminal connected to said gate terminal of said active switch, and an emitter terminal connected to said first terminal; and
a sixth diode arranged between said base terminal and said emitter terminal of second transistor.

9. The driving circuit according to claim 8, wherein said first transistor is a PNP transistor and said second transistor is a NPN transistor.

10. An active clamp DC/DC converter, comprising:
a transformer;
a main switch connected in series with a primary winding of said transformer;
an active clamp branch having an active switch which operates in complementary to said main switch and a clamping capacitor which is connected in parallel with said primary winding of said transformer; and
a driving circuit comprising:
an input terminal receiving an input of a PWM signal;
a first output terminal connected to said main switch for outputting a low-side driving signal;
a second output terminal connected to said active switch for outputting a high-side driving signal;
a first branch having a voltage level shifting capacitor and a first buffer in series between said input terminal and said second output terminal; and
a second branch having a delay circuit and a second buffer in series between said input terminal and said first output terminal;
wherein when said input of said PWM signal drops from a high level to a low level, said input of PWM signal is transmitted to said second buffer through said delay circuit for turning off said main switch and then triggering said first buffer to turn on said active switch, and when said input of PWM signal turns from said low level to said high level, said voltage level shifting capacitor transmits said input of PWM signal to said first buffer for turning off said active switch and then triggering said second buffer to turn on said main switch with a short time delay.

11. The active clamp DC/DC converter according to claim 10, wherein said delay circuit which is a leading edge delay circuit and comprising:
a switch having an emitter terminal connected to said input terminal, a collector terminal connected to an output of said delay circuit, and a base terminal connected to a voltage source through a first resistor and connected to the ground through a second resistor;
a capacitor coupled between said base terminal and said emitter terminal of said switch; and
a diode having an anode terminal connected to said collector terminal and a cathode terminal connected to said emitter terminal of said switch.

12. The active clamp DC/DC converter according to claim 11, wherein said switch is a PNP transistor.

13. The active clamp DC/DC converter according to claim 10, wherein said second buffer comprises:
a NPN transistor; and
a PNP transistor, wherein both emitter terminals of said NPN transistor and said PNP transistor are connected to said first output terminal, and both base terminals of said NPN transistor and said PNP transistor are connected to an output terminal of said delay circuit.

14. The active clamp DC/DC converter according to claim 10, wherein said first buffer comprises:
a terminal connected to a source terminal of said active switch;
a first diode and a second diode connected in series with a capacitor coupled between a voltage source and said terminal, which forms a boost trap circuit;
a first transistor having a collector terminal connected to a terminal of said capacitor, a base terminal connected to said collector terminal thereof through a resistor, and an emitter terminal connected to a gate terminal of said active switch;
a second transistor having a base terminal connected to said voltage level shifting capacitor through a current limited resistor, a collector terminal connected to said base terminal of said first transistor, and an emitter terminal connected to said terminal; and
a third diode and a fourth diode inversely arranged between said base terminal and said emitter terminal of said first transistor and said second transistor respectively.

15. The active clamp DC/DC converter according to claim 14, wherein said first transistor and second transistors are both NPN transistors.

16. The active clamp DC/DC converter according to claim 10, wherein said first buffer comprises:
- a first terminal connected to a source terminal of said active switch;
- a first diode and a second diode connected in series with a first capacitor coupled between a voltage source and said first terminal, which forms a boost trap circuit;
- a first transistor having an emitter terminal connected to a terminal of said capacitor, a base terminal connected to said emitter terminal thereof through a third diode, and a collector terminal connected to a gate terminal of said active switch;
- a second terminal connected to a drain terminal of said active switch;
- a fourth diode and a fifth diode in series arranged between a cathode terminal of said first diode and said second terminal;
- a second capacitor having a terminal connected to said base terminal of said first transistor, and the other terminal connected to a cathode terminal of said fourth diode;
- a second transistor having a base terminal connected to said voltage level shifting capacitor through a current limited resistor, a collector terminal connected to said gate terminal of said active switch, and an emitter terminal connected to said first terminal; and
- a sixth diode arranged between said base terminal and said emitter terminal of second transistor.

17. The driving circuit according to claim 16, wherein said first transistor is a PNP transistor and said second transistor is a NPN transistor.

18. A voltage level shifting method for a driving circuit of a switch-bridge in a DC-DC converter, wherein said switch-bridge comprises a main switch connected in series with an active switch operating in complementary to said main switch, said driving circuit comprises a first branch having a voltage level shifting capacitor and a first buffer connected in series between an input terminal and a second output terminal, and a second branch having a delay circuit and a second buffer connected in series between said input terminal and a first output terminal, comprising the steps of:
- receiving an input of PWM signal;
- transmitting said input of PWM signal to said second buffer through said delay circuit to turn off said main switch and then to trigger said first buffer to turn on said active switch if said input of said PWM signal drops from a relatively higher level to a relatively lower level; and
- transmitting said input of PWM signal to said first buffer at said voltage level shifting capacitor to turn off said active switch and then to trigger said second buffer to turn on said main switch with a short time delay if said input of said PWM signal turns from a relatively lower level to a relatively higher level.

19. The method according to claim 18, wherein said voltage level shifting method further comprises the steps of:
- receiving said input of PWM signal at said input terminal;
- outputting a low-side driving signal at said first output terminal; and
- outputting a high-side driving signal at said second output terminal.

20. The method according to claim 18, wherein said DC-DC converter is one selected from a group consisting of an active clamp forward converter, an active clamp flyback converter, an active clamp forward-flyback converter, a boost converter, and a boost half bridge converter.

* * * * *